United States Patent [19]

Mizutani et al.

[11] Patent Number: 4,523,363
[45] Date of Patent: Jun. 18, 1985

[54] BUSH MOUNTING EQUIPMENT WITH LUBRICATING OIL APPLYING MECHANISM

[75] Inventors: Shinichi Mizutani; Harumi Ajiki, both of Toyota, Japan

[73] Assignee: Toyota Jidosha Kabushiki Kaisha, Japan

[21] Appl. No.: 466,644

[22] Filed: Feb. 15, 1983

[30] Foreign Application Priority Data

Feb. 16, 1982 [JP] Japan ............................ 57-020452[U]

[51] Int. Cl.³ ............................................. B23P 19/02
[52] U.S. Cl. ...................................................... 29/235
[58] Field of Search .............................. 29/235; 184/18

[56] References Cited

U.S. PATENT DOCUMENTS

| | | | |
|---|---|---|---|
| 1,739,270 | 12/1929 | Thiry | 29/235 |
| 2,035,450 | 3/1936 | Barnes | 184/18 |
| 2,550,564 | 4/1951 | Hutton | 29/235 |
| 2,632,236 | 3/1953 | Dodge | 29/235 |
| 2,877,543 | 3/1959 | Myers | 29/235 |
| 3,254,377 | 6/1966 | Morton | 184/18 |
| 3,345,724 | 10/1967 | Miller et al. | 29/235 |

Primary Examiner—James L. Jones, Jr.
Attorney, Agent, or Firm—Finnegan, Henderson, Farabow, Garrett & Dunner

[57] ABSTRACT

A bush mounting equipment with an automatic lubricating oil applying mechanism has a guide holder having a tapered hole, the reduced-diameter portion of which has a diameter equal to the diameter of a bush mounting hole of a work. A lubricating oil feed gap is formed in the circumference of a smaller-diameter end of the tapered hole, and a lubricating oil fed from the lubricating oil feed gap is applied automatically to the outer surface of a bush when the bush passes through the tapered hole while being compressed. The bush then passes through a work holder and is fitted in the bush mounting hole of the work.

10 Claims, 2 Drawing Figures

BUSH MOUNTING EQUIPMENT WITH LUBRICATING OIL APPLYING MECHANISM

BACKGROUND OF THE INVENTION

1. Field of the Invention

The present invention relates to a bush mounting equipment for attaching a rubber bush to a work having a hole. More particularly, it is concerned with a bush mounting equipment provided with a mechanism capable of applying a lubricating oil automatically to the outer surface of a rubber bush being press-fitted.

2. Description of the Prior Art

In press-fitting a rubber bush into a work having a hole, it is necessary to apply a lubricating oil onto the outer surface of the rubber bush. Heretofore, such application of a lubricating oil has been performed manually. But the manual application is disadvantageous in that an increase in man-hour is invited and that press-fitting conditions cannot be set at constant values because of variations in the amount of lubricating oil applied.

SUMMARY OF THE INVENTION

In order to eliminate the above-mentioned problems encountered in the manual application of a lubricating oil to a rubber bush being press-fitted, the present invention has as its object the provision of a bush mounting equipment provided with a mechanism capable of feeding and applying a lubricating oil automatically to a rubber bush being press-fitted in a hole of a work to thereby attain labor saving and at the same time to perform the press fit operation under constant conditions.

In order to achieve the above-mentioned object, in the bush mounting equipment with an automatic lubricating oil applying mechanism of the present invention, a guide holder having a tapered hole including a reduced-diameter portion equal in diameter to a bush mounting hole of a work is mounted in a position adjacent to a holder which holds the work, and a gap which serves as a lubricating oil feed gap is formed in the circumference of the tapered hole of the guide holder. An appropriate amount of a lubricating oil is fed at an appropriate pressure through this gap and applied onto the outer surface of a rubber bush which is passing through the tapered hole while being compressed. Since this application of oil is done automatically and mechanically without manual operation when mounting a rubber bush to the work, the desired object can be attained.

BRIEF DESCRIPTION OF THE DRAWINGS

The above and other objects, features and advantages of the present invention will become apparent and more readily appreciated from the following detailed description of a present preferred exemplary embodiment of the invention, taken in conjunction with the accompanying drawings, in which.

DETAILED DESCRIPTION OF THE PREFERRED EMBODIMENT

A preferred embodiment of the present invention will be described hereinunder while referring as an example to the operation for press-fitting a rubber bush with a cylindrical sleeve into a work which is used as an arm of an automotive part.

Figure 1:
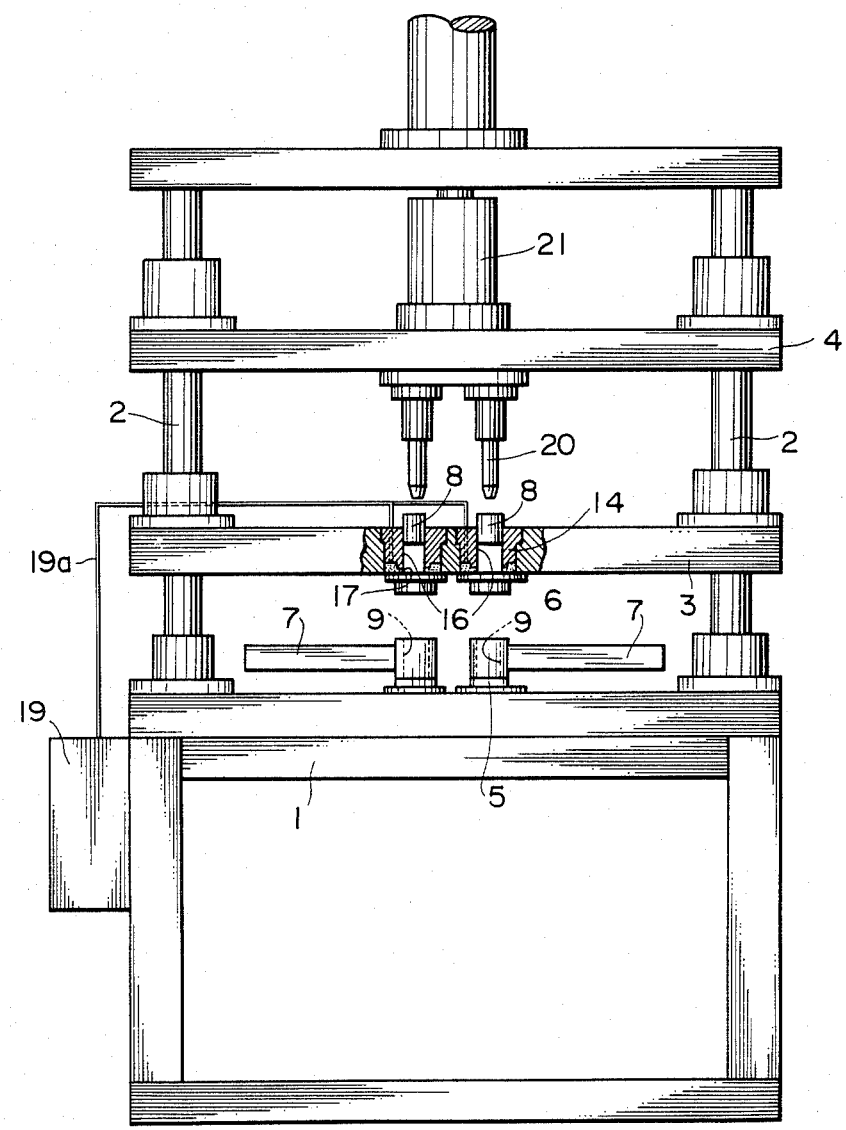
FIG. 1 is a front view, partly in section, of a bush mounting equipment with an automatic lubricating oil applying mechanism, embodying the present invention.
Figure 2:
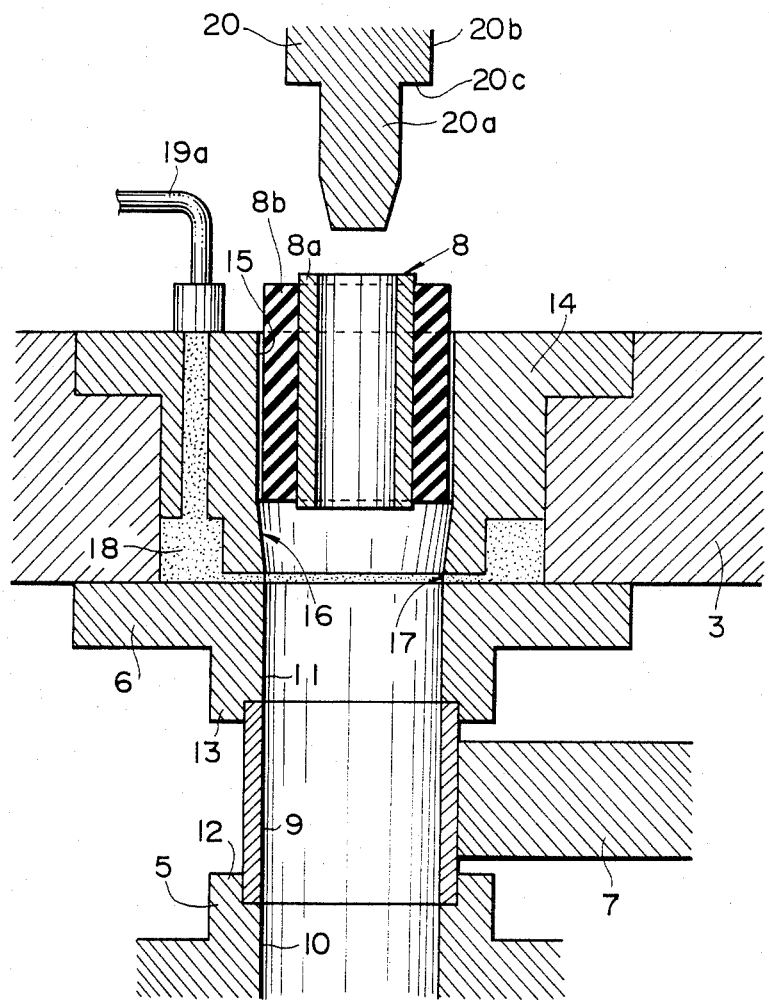
FIG. 2 is a sectional view of a principal portion of the equipment shown in FIG. 1.

Referring first to FIG. 1, there is shown the entirety of an bush mounting apparatus according to the present invention, in which the reference numeral 1 indicates a pedestal of the apparatus, above which are supported a lower ram 3 and an upper ram 4 so as to be vertically movable independently of each other while being guided by struts 2. To the pedestal 1 and the ram 3 are secured a lower holder member 5 and an upper holder member 6, respectively, which are aligned in the vertical direction and form a holder for holding a workpiece 7. The workpiece 7, as shown in FIG. 2, has a bush mounting hole 9 into which is to be fitted a rubber bush 8. The bush mounting hole 9 is aligned vertically with the upper holder member 6 and the lower holder member 5, and in this state the workpiece 7 is held between both holder members. The holder members 5 and 6 are formed with through bush insertion holes 10 and 11, respectively, which are equal in diameter to the bush mounting hole 9 of the work 7. The bush insertion holes 10 and 11 are formed at peripheral edges thereof with annular projections 12 and 13, respectively, adapted to engage the outer periphery of the work 7 so that the holes 9, 10 and 11 may be aligned when the work 7 is held between the holder members 5 and 6. To the ram 3 is fixed a guide holder 14 in alignment with the holder member 6. The guide holder 14 is centrally formed with a vertically extending through hole 15. The lower end portion of the through hole 15, namely, the portion thereof adjacent to the hole 11 of the upper holder member 6, is tapered as indicated at 16. The tapered hole 16 is downwardly smaller and upwardly larger in diameter, and the reduced-diameter portion at the lower end thereof is of the same diameter as that of the bush insertion hole 11 of the upper holder member 6.

In the reduced-diameter portion of the tapered hole 16 at the lower end of the guide holder 14 is formed a gap 17 which extends circumferentially of the tapered hole 16. The gap 17 communicates with a lubricating oil chamber 18 disposed annularly therearound. The lubricating oil chamber 18 is connected through a flexible hose 19a to a lubricating oil feed unit 19, in which are controlled the amount and pressure of a lubricating oil to be fed.

To the upper ram 4 is provided with a press-fitting rod 20 coaxially with the tapered hole 16. The press-fitting rod 20 is provided with a tip end portion 20a of a reduced outside diameter capable of being fitted into a cylindrical sleeve 8a of the rubber bush 8, and also provided with a portion 20b which is stepwise larger in diameter. The press-fitting rod 20 is of a shape permitting its engagement with the upper surface of the rubber bush 8 through a stepped portion 20c. The upper ram 4 is driven in the vertical direction by means of a drive unit 21.

In the above-mentioned apparatus, the operation for mounting the rubber bush 8 to the workpiece 7 is performed in the following manner. First, the workpiece 7 and the rubber bush 8 are set to the lower holder member 5 and guide holder 14, respectively. Then, the lower ram 3 as well as the press-fitting rod 20 and the upper ram 4 move downward. At the lowered end of the stroke of the ram 4, the work 7 is held in place by the upper and lower holder members 6 and 5 in such a state as shown in FIG. 2. Then, from this state, the press-fitting rod 20 further goes down, reaches the rubber bush 8, and its stepped portion 20c comes into engagement with the upper surface of the rubber bush 8, then the rod 20 and the rubber bush 8 together go down. As a sleeve 8b of the rubber bush 8 reaches and passes through the tapered hole 16, the outside diameter portion of the rubber bush 8 is compressed gradually. With further descent, the rubber bush 8 reaches the gap 17 at the lower end of the guide holder 14, whereupon a lubricating oil which is controlled and fed automatically by the lubricating oil feed unit 19 is applied in a predetermined constant amount onto the outer surface of the rubber bush 8 which is passing the gap 17. The rubber bush 8 further goes down, passes through the upper holder member 6 and is fitted into the bush mounting hole 9 of the work 7. Thus, the application of oil to the rubber bush 8 is performed automatically and simultaneously with mounting of the rubber bush 8 to the work 7.

As will be appreciated from the above description, according to the bush mounting equipment with an automatic lubricating oil applying mechanism of the present invention, since lubricating oil can be applied automatically to a rubber bush, it is possible to attain labor saving, to keep constant the amount of lubricating oil to be applied to the rubber bush, and to perform the press-fitting operation under predetermined constant conditions, thereby ensuring a constant good quality.

Although only a preferred embodiment of the present invention has been described in detail, it will be appreciated by those skilled in the art that various modifications and alterations can be made to the particular embodiment shown without materially departing from the novel teachings and advantages of this invention. Accordingly, it is to be understood that all such modifications and alterations are included within the scope of the invention as defined by the following claims.

What is claimed is:

1. A bush mounting device with a lubricating oil applying mechanism, comprising:
   a work holder for holding a workpiece, said work holder having a bush insertion hole with a diameter equal to the diameter of a bush mounting hole formed in said workpiece;
   a guide holder having a tapered hole including a reduced-diameter portion, the diameter of said reduced-diameter portion being equal to that of said bush mounting hole of said workpiece, said guide holder being disposed in a position adjacent to said work holder so that said tapered hole is aligned with said bush insertion hole of said work holder; and
   a lubricating oil feed gap formed in the circumference of a smaller-diameter end of said tapered hole.

2. A bush mounting device as defined in claim 1, wherein said work holder comprises upper and lower members adapted to hold said workpiece from above and below, respectively, in a vertically aligned state with said bush mounting hole of said workpiece.

3. A bush mounting device as defined in claim 2, also including a pedestal and a lower ram, said lower holder member being fixed to said pedestal, and said upper holder member and said guide holder being fixed to said lower ram, said lower ram being vertically movable with respect to said pedestal.

4. A bush mounting device as defined in claim 3, characterized by further including an upper ram mounted above said lower ram, said upper ram being vertically movable with respect to said pedestal, and a press-fitting rod extending coaxially with said tapered hole, said press-fitting rod being fixed to said upper ram.

5. A bush mounting device as defined in claim 4, wherein said press-fitting rod has a tip end portion of a reduced outside diameter sized for fitting into the cylindrical sleeve of said bush, and a portion which is larger in diameter stepwise from said tip end portion.

6. A bush mounting device as defined in claim 4, characterized by further including a drive means for vertically driving said upper ram.

7. A bush mounting device as defined in claim 2, wherein said lubricating oil feed gap comprises a circumferentially extending gap formed between the lower end of said guide holder and the upper end of said upper holder.

8. A bush mounting device as defined in claim 7, wherein said lubricating oil feed gap communicates with a lubricating oil chamber disposed annularly around said lubricating oil feed gap.

9. A bush mounting device as defined in claim 8, wherein said lubricating oil chamber is connected to a lubricating oil feed means through a flexible hose.

10. A bush mounting device with a lubricating oil applying mechanism, comprising:
    a work holder for holding a workpiece, said work holder having a bush insertion hole with a diameter equal to the diameter of a bush mounting hole formed in said workpiece;
    said work holder comprising upper and lower holder members adapted to hold said workpiece from above and below, respectively, in a vertically aligned state with said bush mounting hole of said workpiece;
    a guide holder having a tapered hole including a reduced-diameter portion, the diameter of said reduced-diameter portion being equal to that of said bush hole of said workpiece, said guide holder being disposed in a position adjacent to said work holder for alignment of said tapered hole with said bush insertion hole of said work holder; and
    a circumferentially extending lubricating oil feed gap formed between the lower end of said guide holder and the upper end of said upper holder.

* * * * *